Dec. 14, 1954 R. E. SCHWARTZ 2,697,056
METHOD OF MAKING MAT OF GLASS FIBERS
Filed Feb. 1, 1952
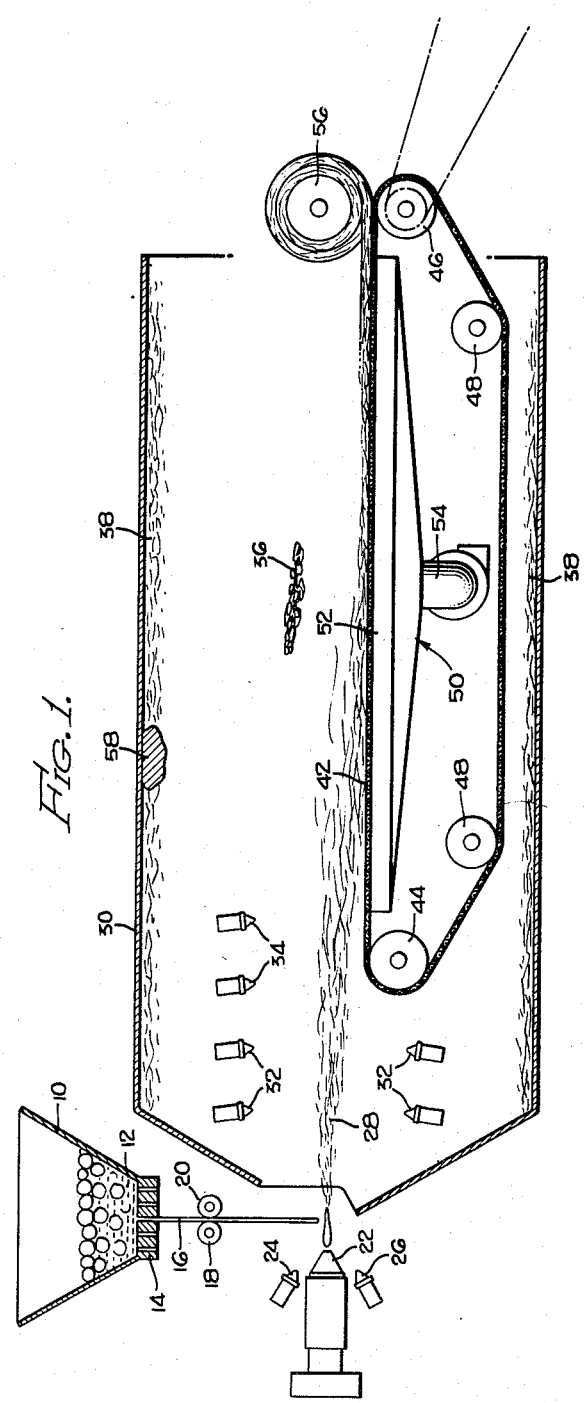
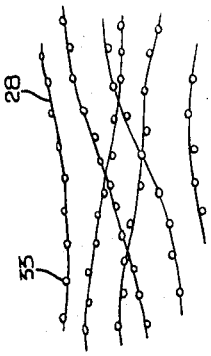
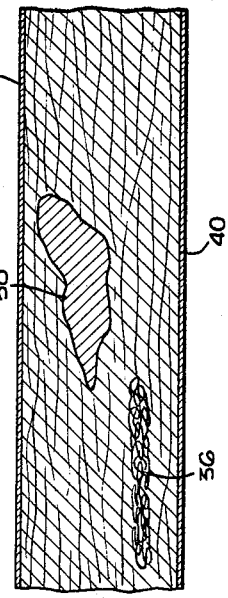
RALPH E. SCHWARTZ,
INVENTOR.
BY
ATTORNEY United States Patent Office 2,697,056
Patented Dec. 14, 1954

2,697,056

METHOD OF MAKING MAT OF GLASS FIBERS

Ralph E. Schwartz, Hollywood, Calif., assignor to Vibradamp Corporation, Los Angeles, Calif., a corporation of California Application February 1, 1952, Serial No. 269,433

2 Claims. (Cl. 154—101)

My invention relates to a mat composed of glass fibers which are bound together by a binder material, and more particularly to a novel mat of glass fibers which is produced under a series of rigid controls and to the method for making this novel mat.

The usual prior art method of making a mat of glass fibers was to melt down quantities of glass and to force this melted glass through a plurality of electrically controlled, heated platinum dies in order to produce primary glass fiber strands. These primary strands are then broken up into a much greater number of smaller secondary glass fibers by passing them in front of hot gas jets. These secondary glass fibers are blown by the hot gas jets into a forming hood into which a binder vapor is introduced and permitted to collect on the individual fibers. After the fibers are blown through the forming hood they are permitted to fall onto a moving belt, the speed of which determines the thickness of the particular layer of fibers which falls and forms thereon. The fiber laden belt is then passed through a heating area in which sufficient hot air is forced through the layer of fibers to cure or polymerize the binder.

Under this prior method of making mats, none of the formative factors or occurrences, such as the type of binder used, additives in the binder, temperature within the forming hood, constancy of the fiber diameter, primary fiber streamers, state of turbulence within the forming hood, "balling," concentrated masses of binder material or heating of the mat is controlled.

By carefully controlling the above and other factors and occurrences during the formation of my glass fiber mat, preferably in the manner hereinafter described, I produce mats which have load-deflection and fatigue characteristics which are far superior to those of the mats that have been fabricated by any of the prior art methods. My mats are also much easier to handle, once they have been formed, and they are unusually sturdy and resistant to crumbling.

It is therefore an object of my invention to provide a glass fiber mat of the character described which has excellent load-deflection and fatigue characteristics, and which may be subjected to great stresses without crumbling.

Another object of my invention is to provide a glass fiber mat of the character described which remains uncured and not polymerized during the entire formative process.

Another object of my invention is to provide a glass fiber mat of the character described which is formed with a binder material that is free from all additives.

Another object of my invention is to provide a mat of glass fibers which contains a controlled binder material that is particularly adapted to a specified use.

Another object of my invention is to provide a mat of glass fibers wherein the diameter of said fibers is substantially constant throughout the mat.

Another object of my invention is to provide a mat of glass fibers which is completely free of primary fiber streamers, "balled" secondary fibers and large concentrations of binder material.

Another object of my invention is to provide a mat of glass fibers which has a substantially uniform distribution of fibers throughout the entire mat.

Another object of my invention is to provide a mat of glass fibers which has sufficient skin to retain mat uniformity even when a plurality of such mats are stacked together, while at the same time the surface of that skin is sufficiently formable to cause inter-adherence when a plurality of my mats are stacked together.

A further object of my invention is to provide a method for producing a mat of glass fibers of the character described comprising a series of controls which are applied during the formation of the mat.

Other objects and advantages of my invention will be apparent from the following description and claims, the novelty consisting in the features of construction, combination of parts, the unique relations of the members, the relative proportioning, disposition and operation thereof, and the controls employed in connection therewith, all as is more completely outlined herein and as is particularly pointed out in the appended claims.

In the drawings, which form a part of the present specification,

Figure 1 is a side elevation, partly in section, of my preferred apparatus for making my mat, Figure 2 is an enlarged sectional view of a segment of my mat, and Figure 3 is a greatly enlarged view of some of my secondary glass fibers with binder droplets sprayed thereon.

Referring to the drawings, and particularly to Figure 1 thereof, I provide a vessel 10 adapted to hold molten glass 12. Vessel 10 may be heated by any conventional means, such as by an electrical or gas heating unit (not shown) associated with vessel 10. By this arrangement, pieces of solid glass may be supplied to vessel 10 from time to time to keep the supply of molten glass within vessel 10 at the desired level.

The sides of vessel 10 are slanted so that the molten glass therein will be conveyed toward one or more dies 14 disposed in the bottom of vessel 10. Although any number of dies 14 may be used, and these dies 14 may be composed of any suitable material, in the preferred embodiment of my invention I provide a large number of platinum dies which are electrically heated. For example, one of my preferred machines has 206 of these dies 14.

Molten glass is forced through the dies 14 by gravity, and it is shaped by the dies 14 into one or more primary glass fibers 16, the number of primary glass fibers 16 in each batch being determined by the number of dies 14.

These primary glass fibers 16 are then pulled downwardly by feed rollers 18 and 20. Any number of rollers 18 and 20 may be used, according to the number and distribution of the dies 14. Figure 1 of the drawings merely illustrates a single die 14, a single primary glass fiber 16, and a single pair of feed rollers 18 and 20. One set of rollers 18 and 20 will suffice for any number of dies disposed in a single plane, but if there is a substantial area at the bottom of vessel 10 covered with dies 14, then more than one set of feed rollers 18 and 20 may be necessary.

The primary fibers 16 are fed by rollers 18 and 20 into position in front of a hot gas jet 22 which blows ignited gas substantially horizontally at the primary fibers 16 as these fibers are moved in front of it by rollers 18 and 20.

Disposed on opposite sides of each gas jet 22 is a pair of air jets 24 and 26 which blow air under high pressure convergently into the gas stream from jet 22 to greatly enhance the flow speed of the gas from jet 22. The combination of air and burning gas from these three jets, 24, 26 and 22, respectively, produces a high-speed movement of hot gaseous matter which strikes the primary glass fibers 16 and causes each of the primary fibers 16 to be split into a large number of secondary fibers 28, each of which has a much smaller diameter than the diameter of the primary fibers 16.

Any desired number of dies 14, gas jets 22 and corresponding air jets 24 and 26 may be used.

The temperature of the molten glass 12 in the vessel 10, the temperature of the heated dies 14, the speed of rotation of the rollers 18 and 20, the rate of flow of the gas out of the gas out of the jets 22, the rate of flow of the air out of the air jets 24 and 26, and the kind of glass that is used are all accurately controlled in my present method so as to be kept at substantially the same values during the formation of each mat. These values may be varied by adjusting the respective controls for different kinds of mats.

By maintaining such controls, the primary fibers 16 are all made substantially the same size, and also the secondary fibers 28 are all made substantially the same size. This is important in the finished mat product because the fatigue factor of the mat is much better if all of the fibers are of substantially the same diameter. These controls also help to eliminate all "streamers," or primary fibers 16 which tend to pile up in front of the jets 22, 24 and 26 due to the turbulence. Also they help to completely eliminate single primary fibers 16 from the finished mat.

After these secondary fibers 28 are thus formed from the primary fibers 16 they are blown further horizontally by the force of the same gaseous stream from the three jets 22, 24 and 26 into a forming hood 30, which is preferably made of sheet metal, but which may be made of any other suitable material.

Disposed within or adjacent to this forming hood 30 are one or more binder jets 32 which are adapted to spray a liquid binder solution into the interior of the forming hood 30 while the secondary fibers 28 are in the forming hood 30.

The binder which is thus sprayed in solution may be any one of a wide variety of binder substances. All thermo-setting plastics are suitable binders for such use in my invention. This group includes, but is not limited to, all of the polyesters, all of the phenols, all of the urea formaldehydes, all of the vinyls, all silicones and various combinations of all of these.

A particular binder is preferably chosen for each use. For instance, certain binders are particularly well suited for use in connection with specific types of glass.

The thickness of the binder solution, the size of the droplets in the spray of binder solution, the total amount of binder solution sprayed upon a given amount of glass fibers, and the disposition of the binder jets are all carefully controlled in order to insure that each of the secondary fibers 28 receives substantially the same amount of binder per unit of length, and in order to insure that the binder distribution in the finished mat is substantially equal, uniform and in the correct proportion of total binder, by weight, to the total amount of glass fibers used in the mat.

The binder is deposited on the secondary fibers 28 in the form of droplets 33, as shown in Figure 3.

I provide one or more water jets 34 in or adjacent to my forming hood 30. These water jets 34 are adapted to spray water into the interior of my forming hood 30. This unique feature of my invention serves several very important purposes, which I will now describe.

There is a natural tendency for the secondary fibers 28 to become electrostatically charged when they are formed so that they will be attracted to each other and also to the inner walls of the forming hood 30. Attraction of the secondary fibers to each other creates a phenomenon called "balling" by those in the art, which merely means that these secondary fibers 28 are attracted together and become entwined in "balls" 36 which ultimately find their way into the finished mat. These "balls" cause undesirable concentrations of fibers and binder to occur in the finished mat. Also these "balls" form fiber junctures which are too large and this in turn reduces the load-deflection and fatigue characteristics of the finished mat.

By spraying water into the forming hood, as above described, I am able to reduce the amount of electrostatic charging of the secondary fibers 28, whereby this balling is correspondingly reduced.

My above-described reducing of the electrostatic charging of the secondary fibers 28 also reduces the electrostatic attraction between these secondary fibers 28 and the inner wall of the forming hood 30, so that there will be a corresponding reduction of the amount of piling up, such as that illustrated by numeral 38 in Figure 1, of secondary fibers 28 on the inner walls of the forming hood 30.

I also control the amount of water which is sprayed from my water jets 34 in view of the particular type of glass and the particular type of binder that is being used in order to reduce the electrostatic charges on the fibers as much as possible.

Another function of the water spray from my jets 34 is to provide a means for cooling the interior of my forming hood. If the temperature within the forming hood is too high, considering the amount of binder sprayed into the forming hood and the speed of the conveyer belt on which the mat is formed (which will be hereinafter described), then a relatively hard and thick "skin" 40 forms on the outside of the mat during the forming process. This makes it difficult to fuse two of my mats together when they are stacked one upon the other, because there is insufficient adhesion between two "skin" surfaces having such a relative hardness.

On the other hand, if the temperature within the forming hood is too low, considering the amount of binder sprayed into the forming hood and the speed of the conveyer belt, then there will be practically no "skin" on the mat surfaces. While laminations of mats of this character will readily adhere to each other, such laminated mats are not sufficiently sturdy to retain their uniformity, and consequently their shape may become distorted. Also, such mats are extremely hard to handle, for they readily adhere to anything with which they may come into contact. Thus, for example, they cannot be rolled up and later be satisfactorily unrolled.

By careful control of the temperature within my forming hood, by either manual or automatic control of the amount of water sprayed into my forming hood 30 through my water jets 34, I produce a mat having exactly the right thickness and hardness of "skin" 40, whereby my mat will not only not become distorted when handled, but also it will readily adhere to another of my mats of the same character when my mats are stacked and pressure is applied to them. My mats may also be rolled up and later they may be satisfactorily unrolled without having the opposed surfaces of the roll become stuck together.

Positioned in the lower portion of my forming hood 30 is a forming belt 42 which is constructed similarly to the usual conveyer belt, comprising a continuous belt which is disposed around forming belt rollers 44 and 46. One of the rollers, 44 or 46, is operatively connected to a source of rotary power (not shown) of any conventional construction in order to drive the belt 42. The amount of this rotary power, and, hence, the speed of the belt 42 is manually adjustable by any conventional means (not shown).

One or more idler rollers 48 may be operatively disposed against the inner surface of the bottom portion of the belt 42 to vary the separation of the top and bottom portions of the generally horizontal belt 42. This permits an air suction mechanism 50 to be placed between the top and bottom portions of belt 42. Mechanism 50 operates like the ordinary vacuum cleaner and comprises generally a suction chamber 52 having an opening which is disposed against, and which is closed off by the relatively porous upper portion of belt 42. Suction is provided in the suction chamber 52 by means of suction pump 54 which is operatively connected to chamber 52.

Suction chamber 52 is positioned near the front portion of belt 42, as shown in Figure 1, in order to draw the secondary fibers 28 with binder droplets thereon down onto the forming belt. Means may be provided (not shown) in the suction pump 54 to vary the relative amount of suction in suction chamber 52, and, hence, on the opposite side of the forming belt 42. By thus controlling the amount of this suction, the distribution of the fibers 28 on the belt 42 may be controlled so that it will be more uniform. Uniformity of the fiber distribution on the forming belt 42 may also be aided by controlling the amount and direction of the air that is blown from air jets 24 and 26.

By thus accurately controlling the suction through the forming belt 42 and the amount and direction of the air that is blown from air jets 24 and 26 I can produce fiber glass mats that are considerably thicker than the ordinary mat of glass fibers. Also my mats are substantially uniform throughout in thickness and in density.

The thickness of my mat is determined by, first, the rate at which the primary fibers 16 are provided in front of the gas jet 22 and the air jets 24 and 26; second, the number of secondary fibers 28 that are produced from each primary fiber 16 by the blast of hot gas on the primary fiber 16 and, third, the rate at which the forming belt 42 moves. My mats are generally formed with a thickness of from ¼" to 1" but they can be made thicker, as desired, by merely slowing down the speed of belt 42.

The density of my mat is determined by the diameter and length of its secondary fibers 28, and by the amount of suction that is provided by suction chamber 52. One example of mat density is 0.05 lb. per square foot.

Positioned above the rear or outer end of the forming belt 42 is a spool 56 upon which my finished mat is wound. Spool 56 is rotated by any conventional source of rotary power (not shown). Providing my mat with the desired "skin," as hereinbefore described, permits my mat to be rolled and stored in this manner.

During the formation of my mat a careful visual inspection is preferably substantially continuously made of various phases of my process. One purpose of this inspection is to completely eliminate primary fibers which might otherwise pass through the entire system and end up in the finished mat, either singly or in the form of "streamers." A "streamer" is a group of primary fibers that have piled up in front of the hot gas jet 22. Sometimes a "streamer" may form in spite of the heretofore mentioned careful controls which have been applied prior to that time in order to produce uniformity of fiber size and in order to eliminate these "streamers" and unsplit primary fibers 16 from the mat. Such "streamers" are eliminated by these visual inspection controls.

One such visual inspection control to eliminate primary fibers in the final mat is a careful inspection of the glass that is being fed to the front of gas jet 22 and air jets 24 and 26.

If any lack of uniformity in the finished mat is observed the temperature of the molten glass 12, the temperature of the dies 14, the speed of the rollers 18 and 20, the speed of the gas stream from gas jet 22 or the speed of the air streams from air jets 24 and 26, or any combination of these factors, may be varied to eliminate the lack of uniformity in the finished mat.

Another visual inspection control to eliminate primary fibers from the finished mat is to watch the fibers entering the forming hood 30, and to physically remove any primary fibers or streamers that may enter the hood 30, either before or after they are deposited on the belt 42.

A further way to eliminate primary fibers from the finished mat is to watch the mat as it comes off of the belt 42, or to inspect the mat at any later time, and then to remove and reject the entire section of the mat having such a primary fiber in it.

The elimination of all primary fibers from the finished mat is of great importance, because the presence of any primary fibers in a finished mat considerably decreases the load-deflection and fatigue characteristics of such a finished mat.

Another purpose of my visual inspection controls is to insure thickness uniformity in my finished mats. As heretofore indicated, the suction from suction chamber 52 may be manually varied to correct any lack of thickness uniformity, and also the flow from the gas jet 22 and the air jets 24 and 26 may be varied to cause a more uniform distribution of the fibers. If these factors have not been sufficiently carefully adjusted to create a uniform finished mat, visual inspection of the finished mat for uniformity thereof may result in the rejection of one or more portions of the finished mat in the same manner, described above, that portions of the mat may have to be rejected because of the occurrence of primary fibers therein.

Blobs of binder such as that shown at 58 may form on the inner surface of forming hood 30, and these may drop off of the forming hood onto the mat. Such concentrations of binder in the finished mat may ruin all of the desirable characteristics of the mat, and hence they must be detected by visual inspection of the forming hood as they form in the forming hood and they must be removed before they have a chance to fall onto the forming belt 42.

In spite of the reduction of the electrostatic charges on the fibers due to the moisture which is sprayed into the forming hood, as hereinabove described, some of the secondary fibers 28 may become attracted to and may become stuck against the inner surfaces of the forming hood as at 38 in Figure 1. These must be detected by visual inspection and scraped off before they drop onto the forming belt 42 and thereby introduce this form of irregularities into the finished mat.

If any of the previously described "balls" 36 ultimately find their way into the finished mat, in spite of the water vapor which is sprayed into the forming hood, these "balls" must be detected by visual inspection of the mat and removed so that none of the important characteristics of the mat are lost by the presence of such imperfections.

The prior art method of making a mat of glass fibers which are bound together by a binder is to cure or polymerize the binder by conveying the mat through a heater after the fibers have been sprayed with the binder and deposited on a conveyer belt. I have completely eliminated this step during the forming process of my mat and have produced an uncured and unpolymerized finished mat, and, because of the controls hereinbefore indicated, my mat is suitable for being handled and laminated even though it is not polymerized. By not curing my mat during the formation thereof, several advantages are obtained. First, the surfaces of my mat are left sufficiently adhesive to permit lamination. After an ordinary fiber glass mat is polymerized or cured by heating, proper lamination is almost impossible. Secondly, my uncured mat can be heat treated in the manner disclosed in my co-pending application Serial No. 269,431 (filed concurrently herewith), to produce the unique finished product described in that application.

Thus, I have produced an uncured mat which has substantial uniformity of glass fiber size and distribution, of binder quantity, of mat thickness and of mat density and which is devoid of impurities.

It is to be understood that the form of my invention herein shown and described is my preferred embodiment and that various changes in the shape, size and arrangement of its parts and in the operative steps of its method may be resorted to without departing from the spirit of my invention or from the scope of the appended claims.

I claim:

1. The method of making a glass fibrous mat which comprises the steps of melting solid glass particles to form a molten mass, flowing said molten glass through die surfaces to form a plurality of primary glass fibers, advancing said primary glass fibers into direct contact with a stream of hot gases, said hot gas being directed substantially normal to the longitudinal axis of said fibers to blast the same into a plurality of secondary glass fibers, collecting said secondary glass fibers in a hood, and onto a moving support, moving said glass fibers therealong through the hood while spraying the same with water and thermosetting resin binder, and heating said mat of fibrous glass to a temperature insufficient to set the resin to provide a fibrous glass mat consisting substantially of secondary glass fibers coated with uncured thermosetting resinous binder.

2. The method of making a glass fibrous mat which comprises the steps of melting solid glass particles to form a molten mass, flowing said molten glass through die surfaces to form a plurality of primary glass fibers, advancing said primary glass fibers into direct contact with a stream of hot gases, said hot gas being directed substantially normal to the longitudinal axis of said fibers to blast the same into a plurality of secondary glass fibers, collecting said secondary glass fibers in a hood, and onto a moving support, moving said glass fibers therealong through the hood while spraying the same with water and thermosetting resin binder, and heating said mat of fibrous glass to a temperature insufficient to set the resin to provide a fibrous glass mat consisting substantially of secondary glass fibers coated with uncured thermosetting resinous binder, said secondary fibers all being substantially of the same size.

References Cited in the file of this patent

UNITED STATES PATENTS

| Number | Name | Date |
|---|---|---|
| 1,901,984 | Pieper et al. | Mar. 21, 1933 |
| 2,288,072 | Collins | June 30, 1942 |
| 2,305,516 | Coss et al. | Dec. 15, 1942 |
| 2,335,102 | Bergin et al. | Nov. 23, 1943 |
| 2,349,909 | Meharg | May 30, 1944 |
| 2,375,182 | Anway | May 8, 1945 |
| 2,389,024 | Brownlee | Nov. 13, 1945 |
| 2,460,899 | Modigliani et al. | Feb. 8, 1949 |
| 2,477,555 | Roberts | July 26, 1949 |
| 2,489,242 | Slayter et al. | Nov. 22, 1949 |
| 2,600,843 | Bush | June 17, 1952 |
| 2,647,851 | Schwartz | Aug. 4, 1953 |